UNITED STATES PATENT OFFICE.

ERIC A. STARKE, OF SAN FRANCISCO, CALIFORNIA, ASSIGNOR TO THE UNITED STATES SMOKELESS POWDER COMPANY, OF SAME PLACE.

SMOKELESS POWDER.

SPECIFICATION forming part of Letters Patent No. 513,737, dated January 30, 1894.

Application filed July 19, 1893. Serial No. 480,950. (No specimens.)

*To all whom it may concern:*

Be it known that I, ERIC A. STARKE, a citizen of the United States, residing in the city and county of San Francisco, State of California, have invented an Improvement in Smokeless Powder; and I hereby declare the following to be a full, clear, and exact description of the same.

My invention relates to an improved explosive compound which is especially designed for use in guns and other weapons. It consists of a combination of an ammonium chromate, potassium or sodium picrate, and ammonium picrate.

In my experiments I have used the ammonium mono-chromate, bi-chromate and tetrachromate, but have found that ammonium bi-chromate gives good results and is very stable. The alkaline picrate having a metallic basis may be either that of sodium or of potassium. The latter I have found very suitable for the purpose. These materials are mixed in the proportion of about twenty parts by weight of ammonium bi-chromate, twenty-five parts of potassium picrate, and fifty-five parts of ammonium picrate.

In compounding my powder I first grind the potassium picrate in a moist condition until it is sufficiently fine for the purpose. The ammonium bi-chromate and ammonium picrate are ground separately, and mixed in a sufficiently damp condition until they are intimately incorporated. The potassium picrate is then incorporated with these other ingredients in any usual or suitable form of powder mill. When the mass has been sufficiently mixed, it is placed in a hydrostatic press and pressed into cakes, and these cakes are then broken up and granulated in the same manner that ordinary black powder is made. After granulation, the powder is dried at a temperature of from 100° to 125° Fahrenheit.

I do not claim broadly the use of potassium picrate or ammonium picrate, as I am aware that these substances have heretofore entered into the composition of powder, but What I do claim as new, and desire to secure by Letters Patent, is—

A compound consisting of an ammonium chromate, potassium picrate, and ammonium picrate, substantially as herein described.

In witness whereof I have hereunto set my hand.

ERIC A. STARKE.

Witnesses:
S. H. NOURSE,
GEO. H. STRONG.